UNITED STATES PATENT OFFICE.

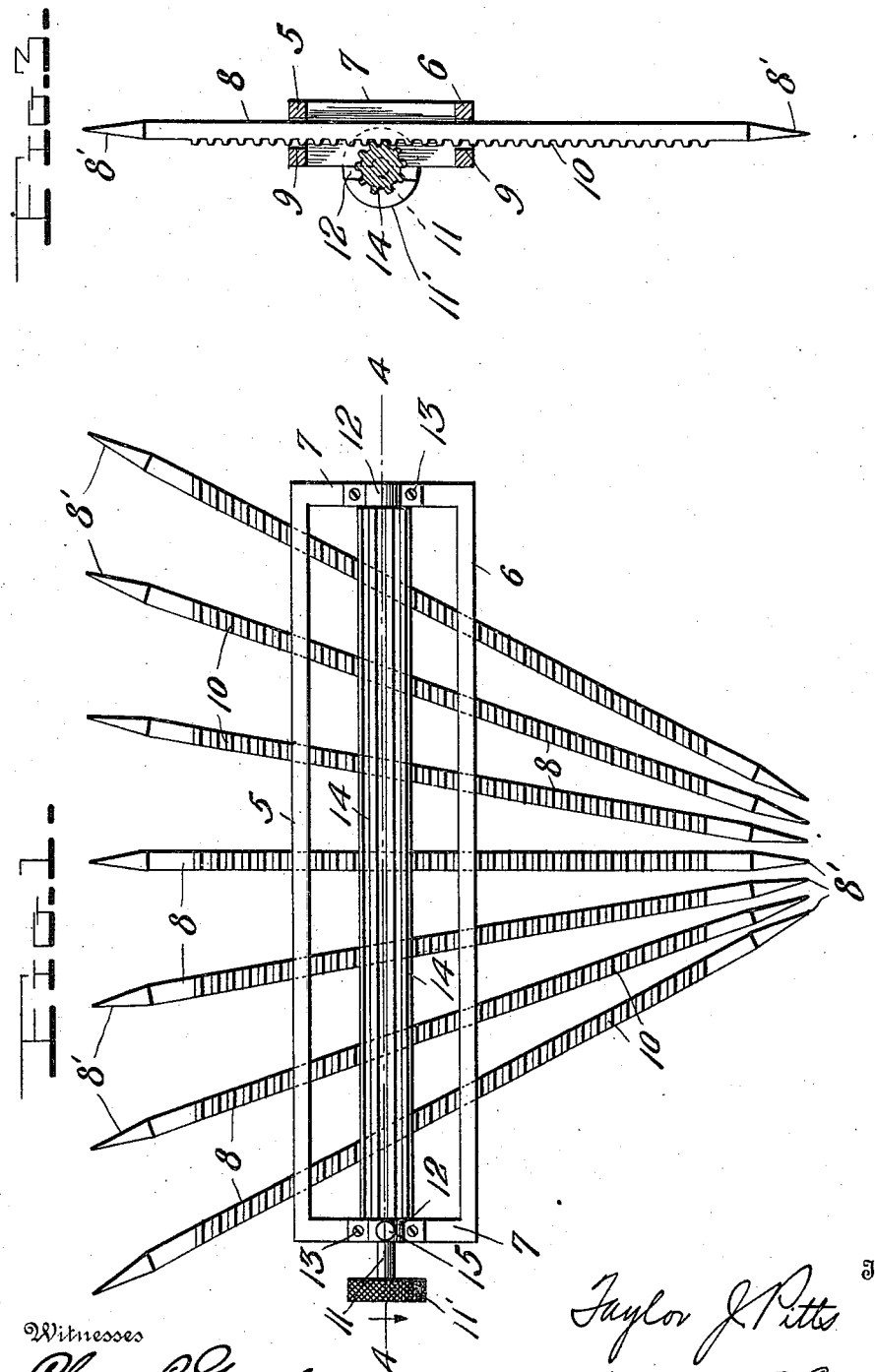

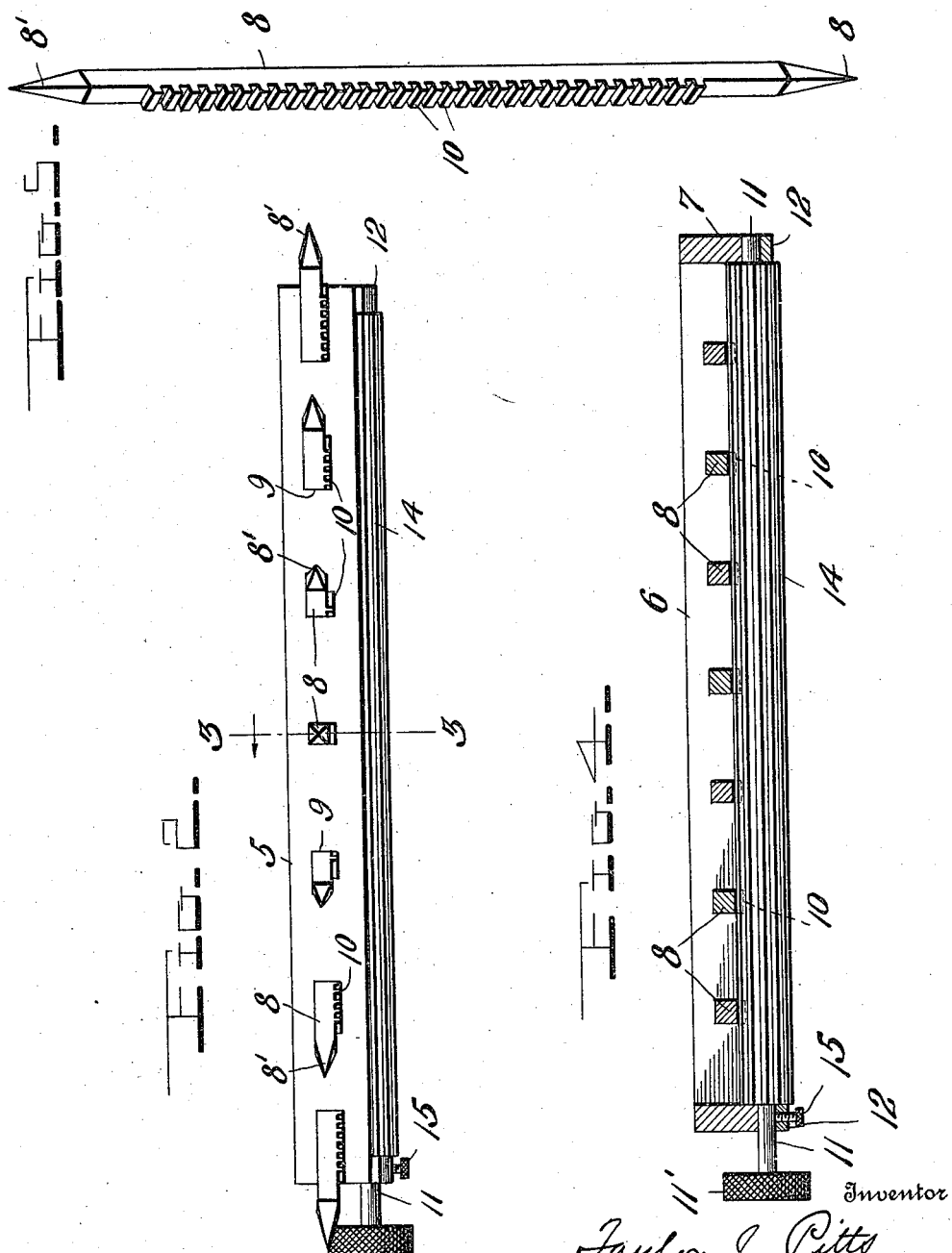

TAYLOR J. PITTS, OF GREENVIEW, ILLINOIS.

MEASURING INSTRUMENT.

965,324.            Specification of Letters Patent.      Patented July 26, 1910.

Application filed December 17, 1909. Serial No. 533,635.

*To all whom it may concern:*

Be it known that I, TAYLOR J. PITTS, a citizen of the United States, residing at Greenview, in the county of Menard and State of Illinois, have invented certain new and useful Improvements in Measuring Instruments, of which the following is a specification, reference being had to the accompanying drawings.

This invention relates to certain new and useful improvements in measuring instruments and more particularly to a divider which is so constructed that any given line may be divided into a number of divisions of equal length.

The primary object of the invention is to provide an instrument of the above character which is adapted to operate with facility and precision to divide a line into as many equal number of divisions as may be desired and to insure absolutely accurate results.

Another object is to provide a line dividing instrument which is of simple construction, may be easily and quickly operated and is capable of a wide range of adjustment.

With these and other objects in view, the invention consists of the novel features of construction and the combination and arrangement of parts hereinafter fully described and claimed, and illustrated in the accompanying drawings, in which—

Figure 1 is a side elevation of an instrument constructed in accordance with the present invention; Fig. 2 is a top plan view thereof; Fig. 3 is a section taken on the line 3—3 of Fig. 2; Fig. 4 is a section taken on the line 4—4 of Fig. 1; and Fig. 5 is a detail perspective view of one of the adjustable arms.

In carrying out the aim and purpose of my invention, I provide an arm carrying frame which comprises two spaced parallel bars 5 and 6 connected at their ends and at intermediate points by the braces 7. These braces may be secured to the arms in any suitable manner but would preferably be brazed or integrally formed therewith. This frame may be constructed in many other forms, as such construction is immaterial to the operation of the device.

A plurality of arms 8 are carried by the frame and are movable through openings 9 formed in the parallel frame bars 5, 6. These arms are convergently arranged in the frame and have their opposite ends pointed, as shown at 8'. Any desired number of the arms 8 may be provided and as shown in Fig. 1 they converge below the bars 6 to a point in vertical alinement with the longitudinal center of the frame. The lower pointed ends of these arms are equally spaced from each other and are adapted to be moved toward the ends of the frame on each side of the central arm, the arms moving synchronously so that an equal space between the points will be maintained at all times, while the convergence of the arms with relation to each other remains constant and unchanged.

Each of the arms is formed with the rack teeth 10 and are actuated by means of a longitudinally toothed rod 11. One end of this rod is provided with the head 11' by means of which the same may be manipulated and it is mounted in the bearing blocks 12 suitably secured between the frame bars 5 and 6. These bearing blocks may be conveniently secured together upon the actuating rod by means of suitable screws 13. The longitudinal teeth 14 of the rod are adapted to engage or mesh with the racks 10 of the arms 8 and to move the same vertically through the openings in the frame bars 5 and 6. The rack teeth 10 of the arms 8 are disposed in parallel relation to the teeth 14 at all times so as to have the proper meshing engagement therewith. The rack teeth of the center bar are at right angles to said bar while those of the remaining bars on either side thereof vary more and more from a right angle to the bar according to the distance of the respective bar from the middle bar.

A central vertically disposed arm 8 is provided and a number of similar arms are positioned upon each side of the central arm. It will be obvious that by rotating the adjusting rod and owing to the engagement of the longitudinal teeth thereof with the rack teeth of said arms, that the latter will be moved vertically through the frame bars and their lower ends gradually moved apart from each other. This spacing movement is synchronous whereby the absolute accuracy of the device may be maintained at all times. After the arms have been thus adjusted in the frame, they may be securely held in such position against accidental movement by means of a set screw 15 which extends through one of the bearing blocks 12 and is adapted to bind against the adjusting rod to prevent the same from being actuated.

In the operation of the instrument, the arms are adjusted in the frame so that the distance between the points of the end arms is approximately the same as that of the line to be divided. The points of the arms are then placed upon the line and the screw turned until the end arms are exactly disposed upon the ends of the line to be divided when the intermediate arms will be found to indicate the divisions of said line which are desired by the operator. Sufficient weight is then brought to bear upon the frame to leave the impression of the points upon the paper or other surface. If a smaller number of divisions are desired, any number of the arms may be removed from the frame by removing the set screws 12 so that the actuating member may be displaced and removed from engagement with the rack teeth of the arms. After removing the arms, the actuating rod may be quickly secured in any of its operative positions.

From the foregoing it will be seen that I have devised a measuring or line dividing instrument which is of comparatively simple construction, absolutely accurate in operation, and of great convenience and utility in drafting rooms and as a mechanical instrument. It will be understood that the various elements employed in the construction of the instrument will be accurately formed so that the line divisions may be obtained with precision and unfailing certainty under all conditions. It will be obvious that where the division of the line will be of comparatively great length, the opposite ends of the arms may be utilized for determining the division points.

While I have shown and described what I deem the preferable embodiment of my invention, it will be understood that I do not wish to be limited thereto as many minor modifications are contemplated within the scope of the invention without departing from the spirit or sacrificing any of the advantages thereof.

Having thus described the invention what is claimed is:

1. A dividing instrument comprising a frame consisting of spaced parallel bars rigidly connected at their ends, a plurality of arms movably disposed through said bars arranged in convergent relation to each other and in the same plane, each of said arms being formed with rack teeth, and a rotatable toothed actuating member mounted in said frame for engagement with the teeth of said arms to simultaneously move the arms in the frame.

2. A dividing instrument comprising a rectangular frame having a plurality of openings therethrough, the openings on opposite sides of the center of said frame being inclined toward said center, a plurality of arms movably arranged through the openings in said frame in convergent relation to each other and in the same plane, and an actuating member rotatably mounted in the ends of the frame engaging with each of said arms to simultaneously move the same through said openings, the angle of convergence of said arms with relation to each other remaining the same at all points of their movement whereby the terminals of the arms are kept in equal spaced relation.

3. A dividing instrument comprising spaced parallel bars rigidly connected together at their ends, each of said bars being formed with a plurality of openings, arms arranged through said openings in convergent relation to each other, a longitudinally toothed cylinder mounted in the ends of said frame, each of said arms having rack teeth disposed in parallel relation to the teeth of said cylinder and adapted for engagement therewith, said cylinder being adapted to be rotated to move the arms through the openings of said bars whereby the terminals of said arms are moved toward and from each other and maintained at equal distances apart.

In testimony whereof I hereunto affix my signature in the presence of two witnesses.

TAYLOR J. PITTS.

Witnesses:
T. J. ALKIRE,
EDWARD SPURLOCK.